United States Patent
Murphy et al.

(10) Patent No.: US 11,400,412 B2
(45) Date of Patent: Aug. 2, 2022

(54) ROTATING SPRAY DEVICE FOR WATER DISTRIBUTION ON MEDIA BED OF A BIOFILTER

(71) Applicant: Evoqua Water Technologies LLC, Lowell, MA (US)

(72) Inventors: Michael Sumner Murphy, Sarasota, FL (US); James Paul Harshman, Bradenton, FL (US); Eric Carl Hansen, Bradenton, FL (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 272 days.

(21) Appl. No.: 15/550,175

(22) PCT Filed: Feb. 12, 2016

(86) PCT No.: PCT/US2016/017696
§ 371 (c)(1),
(2) Date: Aug. 10, 2017

(87) PCT Pub. No.: WO2016/133802
PCT Pub. Date: Aug. 25, 2016

(65) Prior Publication Data
US 2018/0021722 A1    Jan. 25, 2018

Related U.S. Application Data

(60) Provisional application No. 62/118,614, filed on Feb. 20, 2015.

(51) Int. Cl.
*B01D 53/34* (2006.01)
*B01D 53/84* (2006.01)
(Continued)

(52) U.S. Cl.
CPC ........... *B01D 53/346* (2013.01); *B01D 53/84* (2013.01); *C02F 3/006* (2013.01); *C02F 3/043* (2013.01);
(Continued)

(58) Field of Classification Search
CPC ....... B01D 2252/103; B01D 2257/304; Y02W 10/15; C02F 2209/003; C02F 2209/06;
(Continued)

(56) References Cited

U.S. PATENT DOCUMENTS 4,086,167 A * 4/1978 Tapola ................ C02F 3/04
                                                      210/150
4,303,517 A * 12/1981 Love ................ B01D 21/0045
                                                      210/208
(Continued)

FOREIGN PATENT DOCUMENTS

WO    WO-2013015090 A1 *  1/2013  ......... B01D 24/4636

OTHER PUBLICATIONS

Cai Huilang, "English machine translation of WO-2013015090-A1". Translated on Aug. 26, 2020.*
(Continued)

*Primary Examiner* — Liban M Hassan (57) ABSTRACT

A biofilter irrigation system comprises a cylindrical vessel having a central axis, a media bed positioned within the vessel, a spray head system positioned above the media bed, the spray head system comprising a central hub positioned at the central axis of the vessel, at least one arm extending distally from the central hub toward a wall of the vessel and configured to rotate about the central axis, and a plurality of nozzles connected to the at least one arm. The biofilter irrigation system further comprises a fluid outlet positioned below the media bed.

23 Claims, 6 Drawing Sheets

(51) Int. Cl.
*C02F 3/00* (2006.01)
*C02F 3/04* (2006.01)
*C02F 3/10* (2006.01)
*C02F 101/10* (2006.01)

(52) U.S. Cl.
CPC .. *B01D 2252/103* (2013.01); *B01D 2257/304* (2013.01); *C02F 3/107* (2013.01); *C02F 2101/101* (2013.01); *C02F 2209/001* (2013.01); *C02F 2209/003* (2013.01); *C02F 2209/06* (2013.01); *C02F 2209/15* (2013.01); *C02F 2209/265* (2013.01); *C02F 2209/40* (2013.01); *C02F 2209/44* (2013.01); *C02F 2303/02* (2013.01); *Y02A 50/20* (2018.01); *Y02W 10/10* (2015.05)

(58) Field of Classification Search
CPC ................ C02F 2101/101; C02F 3/107; C02F 2209/15; C02F 2209/265; C02F 2209/40; C02F 2209/44; C02F 2303/02; C02F 2209/001
USPC ........................................................ 435/266
See application file for complete search history.

(56) References Cited

U.S. PATENT DOCUMENTS

| | | | |
|---|---|---|---|
| 5,593,574 A | 1/1997 | VanToever | |
| 5,770,090 A * | 6/1998 | Lewis, III | C02F 1/28 205/287 |
| 5,985,649 A | 11/1999 | Stensel et al. | |
| 6,069,003 A | 5/2000 | Ahlqvist | |
| 7,157,271 B2 * | 1/2007 | Ryu | B01D 53/84 435/294.1 |
| 8,772,015 B2 | 7/2014 | Husain et al. | |
| 2004/0152185 A1 * | 8/2004 | Egan | B01D 53/84 435/266 |
| 2009/0090240 A1 * | 4/2009 | Husain | B01D 53/84 95/1 |
| 2009/0093042 A1 * | 4/2009 | Husain | B01D 53/85 435/252.1 |
| 2009/0095041 A1 * | 4/2009 | Ramsey | C01B 21/48 71/58 |
| 2010/0129895 A1 * | 5/2010 | Crawford | B01D 53/18 435/262.5 |
| 2012/0214219 A1 * | 8/2012 | Aines | B01D 53/1425 435/174 |
| 2013/0052113 A1 * | 2/2013 | Molins | B01D 53/04 423/245.1 |
| 2014/0190907 A1 * | 7/2014 | Cai | C02F 1/74 210/794 |

OTHER PUBLICATIONS

"Requisition by the Examiner in Accordance with Subsection 86(2) of the Patent Rules" issued by the Canadian Intellectual Property Office regarding related Canadian Patent Application No. 2,975,878, dated Jan. 7, 2022, 5 pages.

* cited by examiner

ROTATING SPRAY DEVICE FOR WATER DISTRIBUTION ON MEDIA BED OF A BIOFILTER

CROSS-REFERENCE TO RELATED APPLICATIONS

This application claims priority under 35 U.S.C. § 119(e) to U.S. Provisional Patent Application Ser. No. 62/118,614, filed on Feb. 20, 2015, titled "Rotating Spray Device for Water Distribution on Media Bed of a Biofilter" the entire disclosure of which is hereby incorporated by reference in its entirety for all purposes.

BACKGROUND

1. Field of Invention

Aspects and embodiments of the present invention are directed to treatment of wastewater streams, and more particularly, to systems and methods for removing odor causing compounds from the wastewater.

2. Discussion of Related Art

Sewage systems typically include conduits that collect and direct sewage and other waste streams, such as industrial effluents, to a treatment facility. Such systems typically include various pumping facilities, such as lift stations, that facilitate the transfer of wastewater to such treatment facilities. During transit, odorous species are often generated. Such odorous species may be objectionable when released or discharged. Untreated sewage may generate multiple odor-causing compounds. One of the most prevalent and most distinctive compounds formed is hydrogen sulfide ($H_2S$).

Hydrogen sulfide may be formed in wastewater streams by the conversion of sulfates to sulfides by sulfide reducing bacteria (SRBs) under anaerobic conditions. Hydrogen sulfide is dissolvable in water (up to about 0.4 g/100 ml at 20° C. and 1 atmosphere of pressure). In water, hydrogen sulfide exists in equilibrium with the bisulfide ion $HS^-$ and the sulfide ion $S^{2-}$. Unlike sulfide and bisulfide, hydrogen sulfide is volatile, with a vapor pressure of about $1.56 \times 10^4$ mm Hg (2.1 MPa) at 25° C., and may emerge from aqueous solution to form gaseous hydrogen sulfide. The presence of hydrogen sulfide in sewer systems is undesirable due to its offensive odor, toxicity, and corrosivity.

Gaseous hydrogen sulfide exhibits a characteristic unpleasant odor suggestive of rotten eggs. Humans can detect this odor at hydrogen sulfide concentrations as low as four parts per billion (ppb). Hydrogen sulfide is considered toxic. The United States Occupational Safety and Health Administration (OSHA) has established a permissible exposure limit to hydrogen sulfide (8 hour time-weighted average) of 10 ppm. Extended exposure to a few hundred ppm can cause unconsciousness and death. Accordingly, the presence of hydrogen sulfide in sewer systems is found objectionable to people who may come into contact with the gaseous effluent from such sewer systems.

Hydrogen sulfide also supports the growth of organisms such as thiothrix and beggiatoa. These are filamentous organisms which are associated with bulking problems in activated sludge treatment systems.

SUMMARY

In accordance with an aspect of the present invention, there is provided a spray device for irrigation of a media bed of a biofilter.

In some embodiments, a biofilter irrigation system comprises a cylindrical vessel having a central axis, a media bed positioned within the vessel, a spray head system positioned above the media bed, comprising a central hub positioned at the central axis of the vessel, at least one arm extending distally from the central hub toward a wall of the vessel and configured to rotate about the central axis, and a plurality of nozzles connected to the at least one arm, and a fluid outlet positioned below the media bed.

In some aspects, the vessel further comprises a contaminated gas inlet positioned below the media bed. In some aspects, the biofilter irrigation system is configured to remove at least about 90% of contaminants introduced to the biofilter.

In some aspects, the media bed comprises foamed glass media.

In some aspects, the source of bio-nutrients is fluidly connectable to the spray head system.

In some aspects, a source of water is fluidly connectable to the spray head system. In some aspects, two arms extend distally in opposite directions from the central hub toward a wall of the vessel. In some aspects, four arms extend distally from the central hub toward a wall of the vessel and are spaced 90° apart.

In some aspects, a plurality of nozzles is connected to each of a plurality of arms. In some aspects, each nozzle is spaced along each arm at varying lengths from the central hub.

In some aspects, the spray angles of a plurality of nozzles are each adjustable. In some aspects, the flow rates of the nozzles are adjustable. In some aspects, the flow rate of each nozzle is different.

In some aspects, the flow rates of the nozzles vary. In some aspects, the flow rates of the nozzles increase with spacing from the central hub.

In some aspects, the biofilter irrigation system further comprises a control system. In some aspects, the control system comprises at least one sensor positioned in the fluid outlet. In some aspects, the at least one sensor provides an input signal to a controller, which provides an output signal to a source of water. In some aspects, the controller is further connected to a timer. In some aspects, the sensor is configured to identify at least one of pH, nutrient concentration, and hydrogen sulfide concentration.

In some aspects, the cylindrical vessel comprises a plurality of media beds. In some aspects, the cylindrical vessel comprises a spray head system positioned above each of the plurality of media beds.

In some embodiments, a biofilter for the treatment of contaminated air comprises a vessel having a contaminated air inlet, a clean air outlet, and a fluid outlet, a media bed disposed within the vessel, a rotating spray device mounted in the vessel above the media bed and fluidly connected to a source of water, and a control system comprising at least one sensor positioned in at least one of the contaminated air inlet, the clean air outlet, and the fluid outlet, the sensor configured to identify a predetermined parameter, and a controller configured to receive an input signal from the at least one sensor, and provide an output signal to a pump or valve fluidly connected to the source of water.

In some aspects, the rotating spray device comprises a central hub. In some aspects, the rotating spray device comprises at least one arm extending distally from the central hub toward a wall of the vessel. In some aspects, a plurality of nozzles is connected to the at least one arm.

In some aspects, the spray angles of the plurality of nozzles are adjustable. In some aspects, the flow rates of the nozzles are adjustable. In some aspects, the flow rate of each nozzle is different.

In some aspects, the flow rates of the nozzles vary. In some aspects, the flow rates of the nozzles increase with spacing from the central hub.

In some aspects, a plurality of media beds are disposed within the vessel. In some aspects, a rotating spray device is mounted above each of the plurality of media beds.

In some embodiments, a method of facilitating irrigation in a biofilter, comprising providing a rotating spray system comprising a central hub, at least one arm connected to the central hub, the at least one arm configured to rotate about, and a plurality of nozzles connected to the at least one arm, mounting the central hub above a media bed along concentrically about a central axis of a biofilter, and connecting the rotating spray system to a source of water.

In some aspects, the method of facilitating irrigation in a biofilter further comprises providing a control system. In some aspects, the control system comprises at least one sensor configured to transmit an input signal to a controller. In some aspects, the method of facilitating irrigation in a biofilter further comprises connecting the source of water to the control system. In some aspects, the method of facilitating irrigation in a biofilter further comprises connecting a source of bio-nutrients to the control system.

In some aspects, the method of facilitating irrigation in a biofilter further comprises evaluating the operation of the rotating spray system. In some aspects, the method of facilitating irrigation in a biofilter further comprises adjusting at least one parameter of the rotating spray system. In some aspects, adjusting the at least one parameter of a rotating spray system comprises adjusting at least one of a nozzle angle, a nozzle flow rate, the number of arms, and the number of nozzles.

In some embodiments, a wastewater treatment system comprises a wastewater treatment apparatus having a wastewater inlet, a treated water outlet, and a contaminated air outlet; a biofilter fluidly connected to the contaminated air outlet, the biofilter comprising a vessel having a clean air outlet and a fluid outlet, a media bed disposed within the vessel, a rotating spray device mounted in the vessel above the media bed and fluidly connected to a source of water, and a control system comprising at least one sensor positioned in at least one of the clean air outlet and the fluid outlet, the sensor configured to identify a predetermined parameter, and a controller configured to receive an input signal from the at least one sensor, and provide an output signal to the source of water.

In some aspects, the rotating spray device comprises a central hub. In some aspects, the rotating spray device comprises at least one arm extending distally from the central hub toward a wall of the vessel.

In some aspects, a plurality of nozzles is connected to the at least one arm.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawings. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

In wastewater treatment systems, various undesirable chemical species may be generated. For example, sulfur-containing contaminants may be undesirable. Hydrogen sulfide ($H_2S$) is an example of such a species. $H_2S$ is generated in some wastewater treatment systems and is considered an undesirable byproduct. Even small concentrations of $H_2S$ can negatively impact the air quality in the vicinity of a wastewater treatment plant or other components of a wastewater treatment system.

It is generally desirable to remove hydrogen sulfide from the air stream of wastewater streams (referred to herein as "foul air") from sewage systems, manhole headspaces, lift stations, wastewater treatment systems, and/or other systems in which hydrogen sulfide may be generated. Aspects and embodiments disclosed herein include systems and methods for reducing hydrogen sulfide from contaminated air streams. Aspects and embodiments disclosed herein may also be utilized to remove other objectionable and/or odor causing compounds from contaminated air streams, for example, compounds resulting from the volatilization of reduced sulfur compounds in a sewage or wastewater stream such as one or more of carbon disulfide, dimethyl sulfide, dimethyl disulfide, dimethyl trisulfide, methyl mercaptan, ethyl mercaptan, butyl mercaptan, allyl mercaptan, propyl mercaptan, crotyl mercaptan, benzyl mercaptan, thiophenol, sulfur dioxide, and carbon oxysulfide, or hydrogen sulfide generated from any of these compounds by sulfate reducing bacteria. For the sake of simplicity, however, aspects and embodiments disclosed herein will be described as removing hydrogen sulfide from contaminated gas streams.

Aspects and embodiments disclosed herein may remove hydrogen sulfide from contaminated gas streams by evenly distributing a liquid over media within a biofilter to provide nutrients to odor removing microorganisms attached to the media. In some embodiments, hydrogen sulfide oxidizing bacteria, for example, one or more of analochloris beggiatoa, beggiatoa alba, sulfobacillus, thiobacillus, dentificans, thiohalocapsa, halophile, thiomargarita, or thioploca oxidize hydrogen sulfide ($H_2S$) into sulfuric acid ($H_2SO_4$). In some embodiments, the hydrogen sulfide oxidizing bacteria (referred to hereinafter as simply "bacteria"), are present on a media material disposed in a biofilter. The bacteria may form a biofilm on surfaces of the media material. Contaminated air passed through the biofilter contacts the bacteria contained therein and the bacteria remove hydrogen sulfide from the contaminated air by oxidizing the hydrogen sulfide into sulfuric acid. In some embodiments, the biofilter is supplied with water and various nutrients, for example, nitrate, potassium, and phosphate compounds, to provide an environment within the biofilter conducive for the maintenance and/or growth of desirable bacteria populations. The supply of water and nutrients to the biofilter is, in some embodiments, controlled in response to the results of measurements of parameters including, for example, pH and nutrient concentration of liquid within various portions of the biofilter and/or of waste liquid drained from the biofilter.

$H_2S$ may be formed in wastewater streams by the conversion of sulfates to sulfides by sulfide reducing bacteria (SRBs) under anaerobic conditions. $H_2S$ is dissolvable in water (up to about 0.4 g/100 ml at 20° C. and 1 atmosphere). In water, $H_2S$ exists in equilibrium with the bisulfide ion, $HS^-$, and the sulfide ion, $S^{2-}$. Unlike sulfide and bisulfide, hydrogen sulfide is volatile, with a vapor pressure of about $1.56 \times 10^4$ mm Hg (2.1 MPa) at 25° C., and may emerge from aqueous solution to form gaseous hydrogen sulfide. The presence of hydrogen sulfide in sewer systems is undesirable due to its offensive odor, toxicity, and corrosivity.

Gaseous $H_2S$ exhibits a characteristic unpleasant odor suggestive of rotten eggs. Humans can detect this odor at $H_2S$ concentrations as low as four parts per billion (ppb). $H_2S$ is considered toxic. Extended exposure to a few hundred parts per million (ppm) can cause unconsciousness and death. Accordingly, the presence of $H_2S$ in sewer systems is found objectionable to people who may come into contact with the gaseous effluent from such sewer systems.

Hydrogen sulfide also supports the growth of organisms such as thiothrix and beggiatoa. These are filamentous organisms which are associated with bulking problems in activated sludge treatment systems.

Various methods and apparatuses are used to control $H_2S$ emissions. A biofilter utilizes a population of hydrogen sulfide oxidizing bacteria to remove hydrogen sulfide from the vapor phase by converting it to sulfuric acid. The production of sulfuric acid lowers the pH of the water and nutrient passing over the biofilter bed. In the simplest biofilters the pH of the water is controlled by adjusting the flow and frequency of addition of water and nutrient to the media bed of the biofilter. In a more complex example of a biofilter is a biotrickling filter, in which constant dilution and recirculation of water over the bed facilitates stabilization and maintenance of the pH of the biofilter bed at a level conducive for the bacteria to thrive. Traditionally, in the biotrickling filter the introduction of water is done at a constant, unchanging flow set by a manually operated valve. A biofilter may comprise a vessel including a media bed compartment packed with media. A source of liquid constituting irrigation is sprayed on top of the media and this liquid trickles down through the media to a sump to become a treatment water effluent. In a biotrickling filter, at least some of this treatment water effluent is recirculated. By providing a moist environment and nutrients, bacteria are encouraged to grow on the media. Air laden with $H_2S$ is introduced to the bottom of the vessel. As the air rises through the media, an exchange between the gaseous and liquid phase occurs where $H_2S$ is removed from the air, either by dissolving or direct biotreatment. Air, low in $H_2S$ concentration, exits the top of the vessel. Alternatively, top down air flow through the biofilter could be used.

The use of a biofilter represents a continuous process to remove $H_2S$ from emissions from a wastewater stream by biotreatment. This biotreatment utilizes bacteria to oxidize the $H_2S$ to sulfuric acid and then flushes the sulfuric acid out of the system as a liquid solution.

In new installations, bacteria may migrate into a new biofilter along with water vapor from an environment in which the new biofilter is installed to establish a bacterial population effective for the removal of odorous compounds from contaminated air from the environment. The establishment of a sufficiently large desirable bacterial population within the biofilter (referred to herein as "acclimation" of the biofilter) may take between about a day and about a week. In some implementations, a biofilter may be "seeded" with desirable bacteria to shorten the time period required for the biofilter to acclimate.

The bacterial population may require nutrients to survive. For example, the bacterial population may require a fertilizer. In some embodiments, the fertilizer may be a nitrogen-based fertilizer. The nitrogen-based fertilizer may comprise nitrates. In some embodiments, about 20 ppm to about 50 ppm of nutrients may be introduced to the biofilter.

One important aspect of the operation of biofilters is the control of the pH of the liquid in contact with the media. The pH may be measured in the effluent or blow-down or purge from the biofilter. For a given vessel, there is a range of pH that is conducive to acceptable operation. This pH may be in the range of from about 0 to about 4 or from about 1.8 to about 2.2. It has been found that flowing liquid having a pH in the range of from about 0 to about 4 or from about 1.8 to about 2.2 through the media bed of a biofilter is conducive to growing and/or maintaining a population of hydrogen sulfide oxidizing bacteria on media in a media bed of a biofilter. It has been found that if the pH is too low, fouling of the media occurs. If the pH is too high, the removal efficiency of $H_2S$ drops. Thus, it is important to control the pH in the biofilter, for example, as determined by a measurement of pH of effluent from the biofilter. Normally, in previous implementations, pH is controlled by varying the rate of addition of water to the biofilter. If the pH is too low, the flow rate of water to the biofilter is increased. If the pH is too high, the flow rate of water is decreased.

Another important aspect of the operation of biofilters is the control of the pressure drop across a media bed. The pressure drop across a media bed is a measure of the restriction of air flow. A new media bed typically has a pressure drop of less than two inches of water column. For example, a new media bed may have a pressure drop of about 1.5 inches of water column, or less than about 1 inch of water column. An increasing pressure drop across a media bed indicates a restriction of air flow through the media bed. An increasing pressure drop may be caused by, for example, biological growth on the media or degradation of the media bed. A pressure drop of about four inches of water column across the media bed may indicate media restriction due to, for example, media breakdown or organism growth not removed by the water flow. A pressure drop of about four inches of water column generally indicates that the media should be cleaned or replaced.

A common problem for the efficient operation of biofilters is the uneven distribution of water and/or nutrients, also referred to as irrigation, over and through the media bed of the biofilter. Typical two-dimensional spray nozzles, for example, pigtail style spray nozzles, produce uneven spray patterns so that one area of the surface receives significantly more irrigation than another. In this case, one area of the media bed receives an excess of irrigation, while another area of the media bed receives insufficient irrigation. For example, in a standard cylindrical biofilter, the middle 10% of the biofilter media may receive about 50% of the irrigation. The majority of the irrigation may be in the middle 20% of the biofilter media. For example, the middle 20% of the biofilter may receive about 80% of the irrigation. The water distribution may be in an inner area to outer area distribution of up to about 100:1. These typical pigtail style spray nozzles also promote channeling. These problems may lead to excess water usage and inefficient removal of hydrogen sulfide.

Aspects and embodiments disclosed herein are directed to systems and methods for water and nutrient distribution on a media bed of a biofilter. While it is understood that biofilters can be any shape or size, most are cylindrical. It is anticipated that the aspects and embodiments disclosed herein are for use in a cylindrical biofilter. In some embodiments, even distribution of irrigation on a media bed of a biofilter may remove $H_2S$. The irrigation may be introduced into the biofilter by an improved spray device. In some embodiments, the irrigation may be introduced into the biofilter by a rotating spray device. The rotating motion of the rotating spray device may reduce overlap of irrigation distribution, reduce the number of dry areas of the biofilter, and inhibit channeling. The more even distribution of water and nutrients to the biofilter may be more efficient and cost effective. The increased efficiency of the biofilter may lead to a smaller required footprint.

The rotating spray device may comprise a central hub, and at least one arm extending distally from the central hub to a wall of a biofilter vessel. The arm may be configured to not touch the wall. In some embodiments, the rotating spray device may comprise more than one arm extending from the central hub. For example, the rotating spray device may comprise two arms extending from the central hub. In some embodiments, the rotating spray device may comprise four arms extending from the central hub. The at least one arm extending from the central hub may comprise at least one nozzle for spraying water and/or nutrients. In some embodiments, the at least one arm may comprise more than one nozzle for spraying water and/or nutrients. For example, the at least one arm may comprise two nozzles. In some embodiments, the at least one arm may comprise four nozzles. In some embodiments, any number of nozzles may be connected to any number of arms.

The nozzles may be any spray head capable of distributing a liquid. For example, the nozzles may comprise spiral, cone, or fan nozzles. The spray angle of the nozzles may be selected to optimize irrigation distribution over a media bed of the biofilter and to keep the media bed moist. The nozzles may be all the same size, or may be of varying size. For example, the nozzle size may vary with distance from a central axis of the biofilter. In some embodiments, the nozzles may increase in size farther from the center of the biofilter to accommodate a higher flow rate and pressure required to cover a larger area of the biofilter. In some embodiments, the pipe supplying the nozzles with water from a source of water and/or a source of nutrients may comprise a filter to reduce plugging of the nozzles.

In some embodiments, the rotating spray device may be positioned within the vessel of the biofilter. In some embodiments, the rotating spray device may be positioned along a central axis of the biofilter and above the media bed. In some embodiments, a biofilter may comprise more than one spray device. For example, a biofilter may comprise multiple media beds, and a spray device may be positioned above each of the media beds.

The rotating spray device may irrigate the entire biofilter (i.e., 100% of the media bed). In some embodiments, the rotating spray device may provide for even distribution of water and nutrients. For example, the rotating spray device may provide for a nearly even distribution of irrigation from the middle of the biofilter to the outer area of the biofilter. The even distribution of water and nutrients may reduce the hydrogen sulfide concentration in the influent air to the biofilter. In some embodiments, the hydrogen sulfide concentration may be reduced to less than about 5 ppm in the clean air outlet of the biofilter. For example, the hydrogen sulfide concentration may be reduced to less than about 2 ppm. In some embodiments, the hydrogen sulfide concentration may be reduced by at least about 90%. In some embodiments, the hydrogen sulfide concentration may be reduced by at least about 95%. In some embodiments, the hydrogen sulfide concentration may be reduced by at least about 98%. For example, the hydrogen sulfide concentration may be reduced by about 99%.

In some embodiments, the central hub of the rotating spray device may be a tee which connects two arms extending, for example, 180° from each other. The central hub may rotate by way of a swivel fitting, swivel joint, or rotary joint, for example. Each of the arms may comprise spray nozzles chosen to provide a small amount of overlap as they move above the bed. The spray nozzles may be selected such that the area sprayed by each nozzle would provide the same amount of water per unit area over its region of the media. Several arrangements are possible, provided the media bed is fully covered with irrigation. For example, if the inner diameter of a cylindrical vessel is 72 in., the central axis 36 in. from the vessel wall, and the central hub may be positioned so that spray nozzles rotate concentrically about the central axis. If four spray nozzles are used, each spray nozzle would distribute water over a concentric section 9 inches wide. The nozzles may be spaced out in any manner, for example, at 4.5 in., 13.5 in., 22.5 in., and 31.5 in. from the central hub, and such that the linear spacing and the area covered by the nozzles is in the ratio of 1:3:5:7. Flow rates may be adjusted in a similar manner.

In some embodiments, the water is added to the biofilter through the rotating spray device automatically as needed. In an automatically operating system, a pH probe, or sensor, is located within the system, for example, in the drain outlet of the biofilter or in fluid communication with a conduit carrying recirculation water or the treatment water effluent. An electronic controller, for example, a programmable logic controller (PLC) receives a signal from the pH probe and compares the pH value to a setpoint or target pH value or to a range of desirable pH values. If the pH is off target, out of the desired range, or approaching a limit of the desired range, the PLC opens a valve of the source of water and starts a chemical injection pump or opens a nutrient and/or alkaline material flow control valve to introduce water and/or nutrients and/or the alkaline material into the biofilter system. Once the pH is within the desired range or at the target pH value, the controller stops the water and/or nutrient and/or alkaline material addition or sets the rate of introduction of the water and/or nutrients and/or alkaline material into the system at a rate that has been determined sufficient to maintain the pH within the desired range. This rate may vary according to changes in $H_2S$ loading to the biofilter.

In various aspects and embodiments disclosed herein, a fuzzy logic controller is used to monitor the pH of the drain water, the recirculation water, the treatment water effluent, or water in a sump of the biofilter and dynamically adjust the flow of make-up water to the biofilter to stabilize operating parameters, for example, the pH within the biofilter. The disclosed fuzzy logic controller achieves a more precise and narrow control of pH within a specified range, by, for example, increasing make-up water flow during high $H_2S$ loadings, and decreasing or turning off water during periods of low $H_2S$ loadings. This results in better control of the pH of the biofilter while using significantly less water. The characteristics of embodiments of a fuzzy logic control of a biofilter are discussed in detail in U.S. Patent Publication No. 2015/0217228, titled "Biofilter with Fuzzy Logic Control," filed on Oct. 24, 2014, which is assigned to Evoqua Water Technologies, LLC, and is incorporated in its entirety herein by reference.

The use of a removable rotating spray device enables older style systems, where appropriate, to be retrofitted with embodiments of the present disclosure, while also allowing easy adjustment and optimization of hydrogen sulfide concentration reduction in any particular biofilter.

Figure 1:
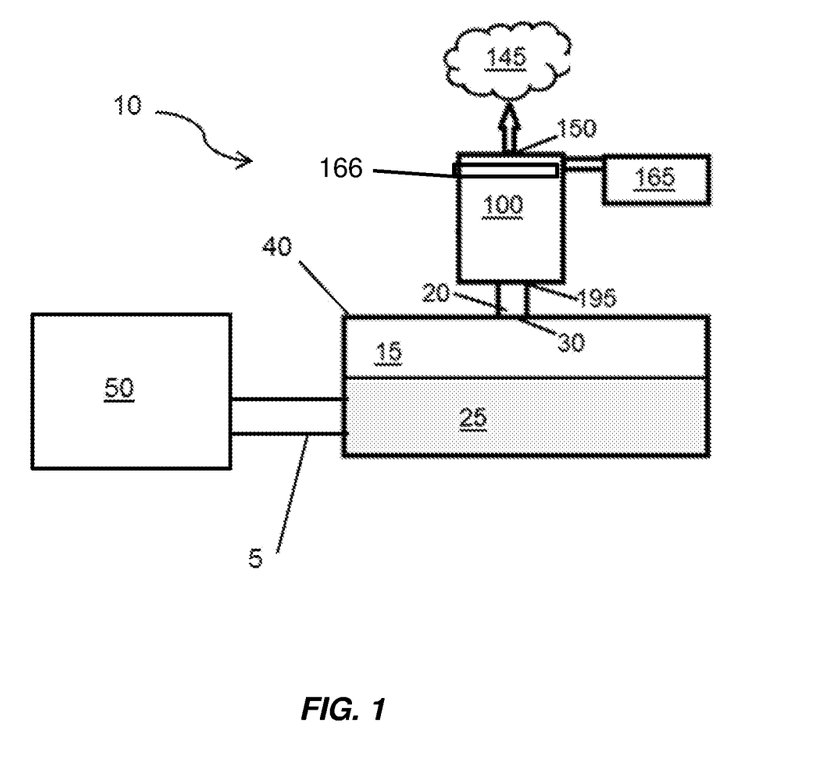
FIG. 1 is a schematic diagram of a system generating an objectionable gaseous species and a biofilter coupled to the system to remove the objectionable gaseous species from air from the system.

As illustrated schematically in FIG. 1, a system 10, for example, a wastewater treatment system or a sewer system comprises a wastewater treatment apparatus 40 which has an inlet 5 in fluid communication with a source 50 of liquid, for example, wastewater. The wastewater treatment apparatus 40 includes a space 15, for example, a conduit, a lift station, or a wastewater treatment basin, that includes liquid 25, for example, wastewater, that generates one or more objectionable gaseous species, for example, hydrogen sulfide or any one or more of the other compounds discussed above. A biofilter 100 may be provided to remove one or more of the objectionable gaseous species from air in or exiting the space 15. A contaminated air inlet 195 in fluid communication with an internal volume of the biofilter 100 vessel may be coupled to a headspace of the space 15 by a conduit 20 providing fluid communication between a process gas outlet 30 of the space 15 and the contaminated air inlet 195. In other embodiments, the biofilter 100 may be disposed within the space 15. The biofilter 100 draws contaminated air from the headspace of the space 15 into the contaminated air inlet 195, treats the contaminated air to remove the one or more of the objectionable gaseous species, for example, by oxidation by sulfur compound oxidizing bacteria, and releases the resultant treated air 145 though a treated air outlet 150 in fluid communication with the internal volume of the biofilter 100 vessel into the environment and/or back into the space 15. In some embodiments, the system 10 further includes a rotating spray device 166 configured to provide irrigation to the biofilter 100 vessel.

The rotating spray device 166, which is described in more detail below with regard to FIG. 5, may comprise a central hub, and at least one arm extending distally from the central hub. In some embodiments, the rotating spray device 166 may comprise more than one arm extending from the central hub. For example, the rotating spray device may comprise two arms extending from the central hub. In some embodiments, the rotating spray device 166 may comprise four arms extending from the central hub. The at least one arm extending from the central hub may comprise at least one nozzle for spraying water and/or nutrients. In some embodiments, the at least one arm may comprise more than one nozzle for spraying water and/or nutrients. For example, the at least one arm may comprise two nozzles. In some embodiments, the at least one arm may comprise four nozzles. Any number of nozzles may be connected to any number of arms.

The nozzles may be any spray head capable of distributing a liquid. For example, the nozzles may comprise spiral, cone, or fan nozzles. The nozzles may be adjustable to any spray angle required to keep the media bed moist. The nozzles may also be constructed and arranged to provide a variety of water flow rates. For example, the nozzles positioned distal from the central hub may be constructed and arranged to provide a higher water flow rate than the nozzles positioned proximate to the central hub.

Figure 2:
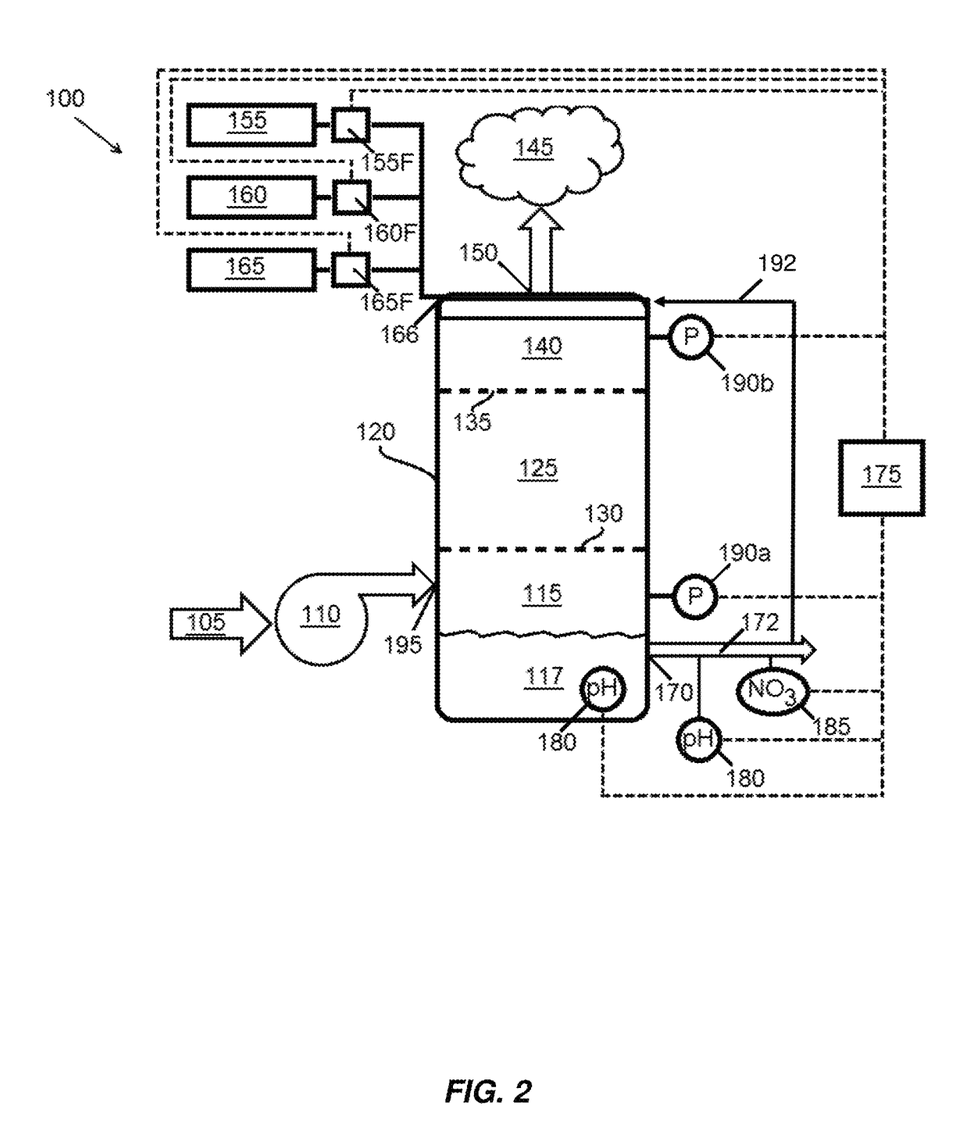
FIG. 2 is a schematic diagram of a biofilter for treating a contaminated air stream.

FIG. 2 illustrates one embodiment of a biofilter, indicated generally at 100, for the treatment of contaminated air. The biofilter (also referred to as a biofiltration system) 100 is supplied with contaminated air 105, for example, air from the headspace of a sewage system or a wastewater treatment system. The contaminated air 105 contains unwanted or odorous compounds including, for example, hydrogen sulfide. While FIG. 2 is described with reference to hydrogen sulfide, the biofilter 100 may alternatively or additionally be used to mitigate other chemical species. The contaminated air 105 is blown through a blower 110 and through a contaminated air inlet 195 into a lower plenum 115 of a vessel 120 of the biofilter 100. Alternatively or additionally, the contaminated air 105 may be pulled through the biofilter vessel 120 by a fan or blower located at a treated air outlet 150 of the biofilter vessel 120. The contaminated air passes through the lower plenum 115 and into a media bed compartment 125 of the biofilter 100 that is disposed within the biofilter vessel 120 in fluid communication between the contaminated air inlet 195 and the treated air outlet 150.

The media bed compartment 125 includes a bed of media, for example, particulate media, on which bacteria reside. The media is retained in the media bed compartment 125 by a lower screen 130 and, optionally, an upper screen 135. The contaminated air passing through the media bed compartment 125 contacts the media and the bacteria on the media and in the water in the media bed compartment 125. The bacteria in the media bed compartment 125 consume hydrogen sulfide in the contaminated air, removing the hydrogen sulfide from the contaminated air and converting the contaminated air into treated air.

The treated air passes through an upper plenum 140 of the biofilter 100 and is released to the external environment 145 or a polishing unit through the treated gas outlet 150 of the biofilter vessel 120. A lower portion of the plenum 115 may function as a sump 117 which may retain fluid draining from the media bed compartment 125. Sulfuric acid produced by the bacteria, water, unutilized nutrients, and other waste fluids exit the sump 117 through a drain outlet 170 connected to drain line 172. The waste fluid in drain line 172 may be returned to a sewage system or wastewater treatment system from which the contaminated air was withdrawn or may be otherwise treated, for example, to neutralize the acid in the waste fluids, or disposed of. At least some treatment water effluent is recirculated 192 from sump 117 to media bed compartment 125.

The materials of construction of the biofilter vessel 120 are desirably resistant to attack by acid, for example, sulfuric acid, which is generated by the bacteria in the biofilter vessel 120. The walls of the biofilter vessel 120 and the upper and lower screens 130, 135 may be formed from, for example, fiberglass and/or an acid resistant polymer and/or may be coated with an acid resistant material.

Media used in the media bed compartment 125 of the biofilter vessel 120 may be composed of various organic and/or inorganic materials, including, for example, wood mulch, pine bark, gravel, pumice, expanded shale, fired clay, and polymeric open celled foam (referred to hereinafter as "traditional media materials"). The media is referred to synonymously herein as "biofiltering media." The biofiltering media is configured to support growth and maintenance of a population of hydrogen sulfide oxidizing bacteria on the biofiltering media. To support growth and maintenance of a population of hydrogen sulfide oxidizing bacteria, the biofiltering media may be porous or fiberous to provide a large surface area on which the hydrogen sulfide oxidizing bacteria may grow, and may be resistant to degradation by acid and/or non-reactive with acids, for example, sulfuric acid in an operating pH range of the biofilter (in some instances, from about 1.8 to about 2.2).

Glass ($SiO_2$) media, for example, sintered glass media, foamed glass media or other silica based media, may be utilized in place of traditional media materials in biofilters for the removal of odorous compounds, for example, hydrogen sulfide, from contaminated air. The characteristics of embodiments of glass-based biofilter media are discussed in detail in U.S. Patent Publication No. 2015/0321132, titled "Apparatus and Method for Sintered Glass Media Biofilter," filed on May 6, 2014, which is assigned to Evoqua Water Technologies, LLC and U.S. patent application Ser. No. 14/920,407, titled "Use of Porous Glass Media for a Biofilter to Remove Odorous Compounds from an Air Stream," filed on Oct. 22, 2015, to Evoqua Water Technologies, LLC, which are incorporated herein by reference in their entireties.

To provide an environment conducive to the maintenance and/or growth of a desirable bacterial population within the biofilter 100, the biofilter may include a water introduction system configured to introduce water from a source of water into the biofilter vessel. Water from a source of water 155, and/or nutrients, for example, nitrogen, potassium, and/or phosphorus compounds from a source of nutrients 160 is introduced into the biofilter vessel 120 through a spray device 166 of the biofilter vessel 120. In some embodiments, alkaline materials are introduced into the biofilter vessel 120 from a source of alkaline material 165 through the spray device 166. In some embodiments, the source of water 155 and/or source of nutrients 160 and/or source of alkaline material are external to the biofilter vessel 120. In some embodiments, the nutrients are supplied as an aqueous solution. The liquid entering through spray device 166 may generally be referred to as irrigation.

Upon entering the biofilter vessel 120, the water and/or nutrients are distributed over the top of the media bed in the media bed compartment 125 by the spray device 166. The water and/or nutrients are periodically or, alternatively, continuously provided to the media bed in the media bed compartment 125.

The rotating spray device 166 may comprise a central hub, and at least one arm extending from the central hub. The central hub may be positioned concentrically about a central axis of the biofilter vessel 120. In some embodiments, the rotating spray device 166 may comprise more than one arms extending from the central hub. For example, the rotating spray device 166 may comprise two arms extending distally from the central hub toward a wall of the biofilter vessel 120. In some embodiments, the rotating spray device 166 may comprise four arms extending from the central hub. The at least one arm extending from the central hub may comprise at least one nozzle for spraying water and/or nutrients. In some embodiments, the at least one arm may comprise more than one nozzle for spraying water and/or nutrients. For example, the at least one arm may comprise two nozzles. In some embodiments, the at least one arm may comprise four nozzles. In some embodiments, a plurality of arms may extend distally from the central hub. For example, two arms may extend distally from the central hub. In another example, four arms may extend distally from the central hub. Any number of nozzles may be connected to any number of arms. The nozzles may be any spray head capable of distributing a liquid. For example, the nozzles may comprise spiral, cone, or fan nozzles. The nozzles may be adjustable to any spray angle required to keep the media bed moist. The nozzles may be constructed and arranged to provide a variety of water flow rates. For example, the nozzles distal from the central hub may provide a higher water flow rate than the nozzles proximate to the central hub. In some embodiments, no two nozzles are the same distance apart.

In some embodiments, flow control devices 155F, 160F, and 166F may be utilized to control the flow of water, nutrients, and alkaline material, respectively, from the sources of water, nutrients, and alkaline material 155, 160, and 165. In some embodiments, one or more of the flow control devices 155F, 160F, and 165F are manually controlled flow valves or pumps. In other embodiments one or more of the flow control devices 155F, 160F, and 165F are flow valves or pumps that are automatically controlled by an electronic control system 175, described below. In other embodiments one or both of the flow control devices 155F, 160F, and 165F include flow meters to measure the flow of water, nutrients, and alkaline material, respectively, through the flow control devices 155F, 160F, and 165F.

The biofilter 100 may be provided with one or more sensors which provide information to the controller 175. The controller 175 analyzes the information from the one or more sensors and adjusts a timing/and or rate of introduction (or more generally, an amount per unit time added to the biofilter) of water and/or nutrients and/or alkaline material from the source of water 155 and/or source of nutrients 160, and/or a source of alkaline material, respectively, into the biofilter vessel 120 responsive to an analysis of the information. In some embodiments, one of the nutrients and the water may be added or introduced to the biofilter at a fixed rate and the other of the nutrients and the water may be added or introduced to the biofilter at an amount per unit time or flow rate controlled by the controller 175.

It has been discovered that methods of operation of a biofilter may be improved by using automated fuzzy logic control process that will control the effluent pH, for example, to maintain the effluent pH within a desired range.

In some embodiments, the controller 175 may also control a speed of the blower 110 responsive to an analysis of information provided from one or more sensors associated with the biofilter 100, for example, one or more sensors may provide information regarding a concentration of $H_2S$ entering and/or exiting the biofilter 100 or a percent of $H_2S$ from contaminated air removed by the biofilter to the controller 175.

The biofilter 100 may include one or more pH sensors (also referred to as "pH probes") 180, positioned downstream of the media bed and configured to measure a pH of liquid having passed through the media bed and to provide an indication of the pH to the electronic control system. The one or more pH sensors 180 may be positioned in, for example, sump 117 and/or in fluid communication with the drain line 172 or otherwise positioned downstream of the media bed of the biofilter. A nutrient concentration sensor 185 configured to measure a concentration of one or more components of a nutrient supplied to the biofilter 110 may be provided in fluid communication with fluid within and/or drained from the biofilter vessel 120 through the drain line 172. Sensor 185 is illustrated as coupled to the drain line 172 in FIG. 2, but in other embodiments may be located or configured to measure parameters of fluid within the media bed 125, lower plenum 115, sump 117, or other portions of the biofilter 100.

The pH measured by the pH sensor(s) 180 may be utilized by the controller 175 to control or regulate a flow rate and/or frequency of addition of water from the source of water 155, and/or nutrients from the source of nutrients 160, and/or alkaline material from the source of alkaline material 165 into the biofilter vessel 120. Controlling the flow of water may, in turn, aid in controlling the pH within the vessel 120. In some embodiments, the controller 175 is configured to maintain an acidic pH within the biofilter vessel 120. A pH of between about 0 and about 4 in the fluid within the biofilter vessel 120 and/or in the sump 117 may be indicative of a pH level within the media bed conducive for hydrogen sulfide consuming bacteria to grow. More particularly, a pH between about 1.8 and about 2.2 may be desired. According to some embodiments a pH set point of about 2.0 may be desired. The controller 175 may be configured to control the introduction of water and/or nutrients and/or alkaline material and/or contaminated air into the biofilter to maintain the pH in the biofilter, for example, in the media bed, within these desired ranges or at about this desired set point.

One or more pH sensors 180 in communication with the controller 175 may be placed at various locations in the system to measure pH. For example, in FIG. 2, pH sensor(s) 180 are located in sump 117 and/or in fluid communication with the drain line 172.

The controller 175 may control the flow of water and/or nutrients and/or alkaline material into the biofilter vessel 120 according to a fuzzy logic algorithm in response to the measurements of the pH sensor(s) 180 as discussed in greater detail below. However, the controller 175 is not limited to using pH as an input parameter. Nor is the controller 175 limited to controlling the output parameters of water flow and/or nutrients addition to the biofilter. In some embodiments, the controller 175 may respond to other input parameters, including without limitation, pressure values, hydrogen sulfide concentrations in the air stream, nutrient concentration, and air flow or water flow values. The controller 175 may respond to input from any sensor of the system. Further, the controller 175 may be implemented to control any output parameter of the system, including without limitation, water flow rate of any system stream, air flow rate, or nutrient addition rate.

Another type of sensor that may be used in the biofilter 100 includes one or more flow meters. As discussed above, flow meters may be included in one or more of the fluid flow control devices 155F, 160F, and 165F. Alternatively or additionally, a flow meter may be placed elsewhere within the system.

The nutrient concentration measured by the nutrient sensor 185 is utilized by the controller 175 to control a flow rate and/or frequency of the flow of nutrients from the source of nutrients 160 into the biofilter vessel 120. A nutrient concentration or a concentration of a component of nutrient supplied to the biofilter 100 below a lower threshold within the biofilter vessel 120 and/or exiting the drain 170 of the biofilter vessel 120 may be indicative of insufficient nutrients being supplied to the bacteria. A nutrient concentration or a concentration of a component of nutrient supplied to the biofilter 100 above an upper threshold in fluid within the biofilter vessel 120 and/or exiting the drain 170 of the biofilter vessel 120 may be indicative of an excessive amount of nutrients being supplied to the bacteria. The controller 175 may control the flow of nutrients into the biofilter vessel 120 according to a fuzzy logic algorithm in response to the measurements of the nutrient sensor 185, as discussed in greater detail below.

Pressure sensors 190a, 190b provide an indication of the differential pressure, or pressure drop, across the biofilter vessel 120 and/or media bed compartment 125. A pressure drop exceeding an upper threshold value, for example, between about two inches (5.1 cm) and about 10 inches (25 cm) of water column (four degrees Celsius) (between about 498 Pascal and about 2,491 Pascal) may be indicative of the biofilter vessel 120 and/or media bed compartment 125 being blocked, for example, by contaminants or by overpacking of media in the media bed compartment 125. Responsive to the detection of a pressure drop exceeding an upper threshold, the controller 175 may increase the speed of the blower 110 to maintain an air flow through the biofilter vessel 120 within a desired range and/or may shut down the biofilter 100A and/or provide an indication to an operator that the biofilter 100A may be in need of service. A pressure drop which decreases over time may be indicative of the biofilter vessel 120 and/or media bed compartment 125 exhibiting channeling, for example, due to channels forming through the media bed and/or by poor distribution or mispacking of media in the media bed compartment 125. Responsive to the detection of a drop in the pressure drop, the controller 175 may shut down the biofilter 100 and/or provide an indication to an operator that the biofilter 100 may be in need of service.

In some embodiments, the controller 175 is configured to control a rate of introduction of the nutrients and a rate of introduction of water into the filter to be sufficient to both maintain the pH of the liquid in the biofilter, for example, in the media bed, within a range conducive to maintain a population of hydrogen sulfide oxidizing bacteria in a media bed of the filter and to prevent clogging of the media bed, for example, by providing sufficient water to rinse salts which may accumulate in the media bed.

The controller 175 used for monitoring and controlling operation of the biofilter 100 may include a computerized control system. Various aspects of the invention may be implemented as specialized software executing in a general-purpose computer system 200 such as that shown in FIG. 3. The computer system 200 may include a processor 202 connected to one or more memory devices 204, such as a disk drive, solid state memory, or other device for storing data. Memory 204 is typically used for storing programs and data during operation of the computer system 200. Components of computer system 200 may be coupled by an interconnection mechanism 206, which may include one or more busses (e.g., between components that are integrated within a same machine) and/or a network (e.g., between components that reside on separate discrete machines). The interconnection mechanism 206 enables communications (e.g., data, instructions) to be exchanged between system components of system 200. Computer system 200 also includes one or more input devices 208, for example, a keyboard, mouse, trackball, microphone, touch screen, and one or more output devices 210, for example, a printing device, display screen, and/or speaker.

Figure 3:
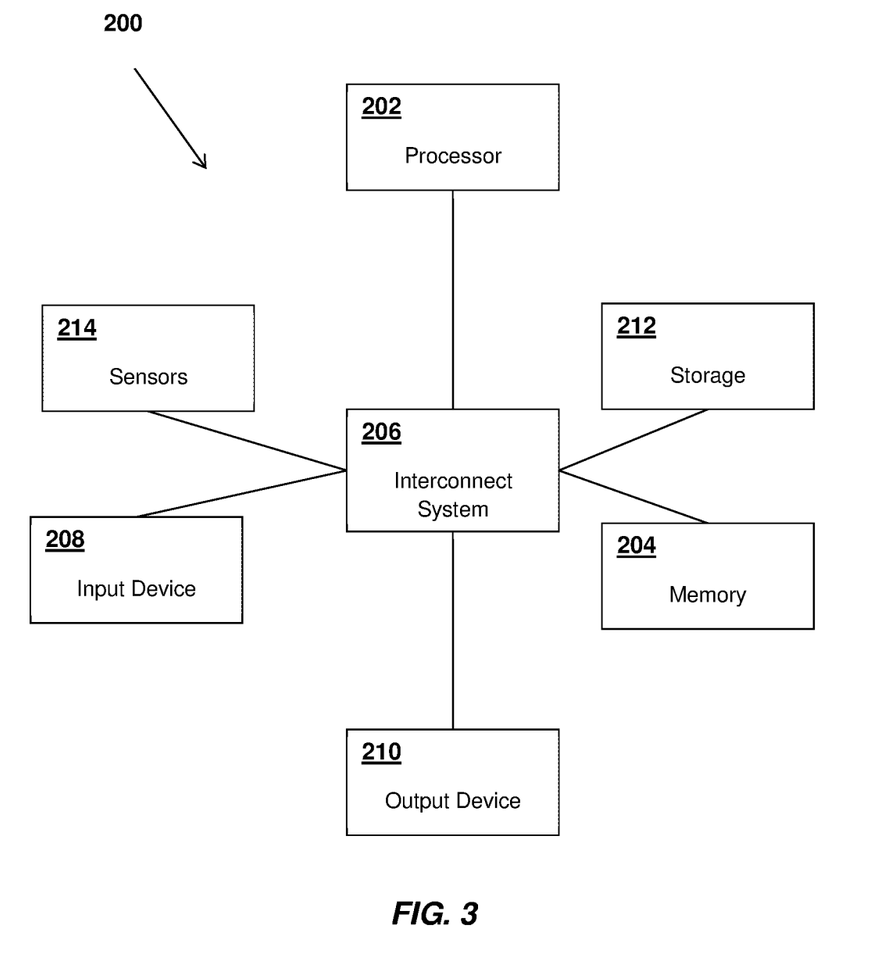
FIG. 3 is a block diagram of a computer system upon which embodiments of a method for treating a contaminated air stream may be performed.

The output devices 210 may also comprise valves, pumps, or switches which may be utilized to introduce water and/or nutrients and/or alkaline material from the source of water 155 and/or the source of nutrients 160 and/or the source of alkaline material 165 into the biofilter and/or to control the speed of a blower of the biofilter. One or more sensors 214 may also provide input to the computer system 200. These sensors may include, for example, pH sensor(s) 180, nutrient sensor 185, pressure sensors 190a, 190b, sensors for measuring a concentration of an undesirable component of contaminated and/or treated air, for example, $H_2S$, and/or other sensors useful in a biofilter system. These sensors may be located in any portion of a biofilter system where they would be useful, for example, upstream of a media bed, downstream of a media bed, in communication with a liquid waste outlet of a biofilter vessel, and/or in communication with an air or gas inlet and/or outlet of a biofilter vessel. In addition, computer system 200 may contain one or more interfaces (not shown) that connect computer system 200 to a communication network in addition or as an alternative to the interconnection mechanism 206.

Figure 4:
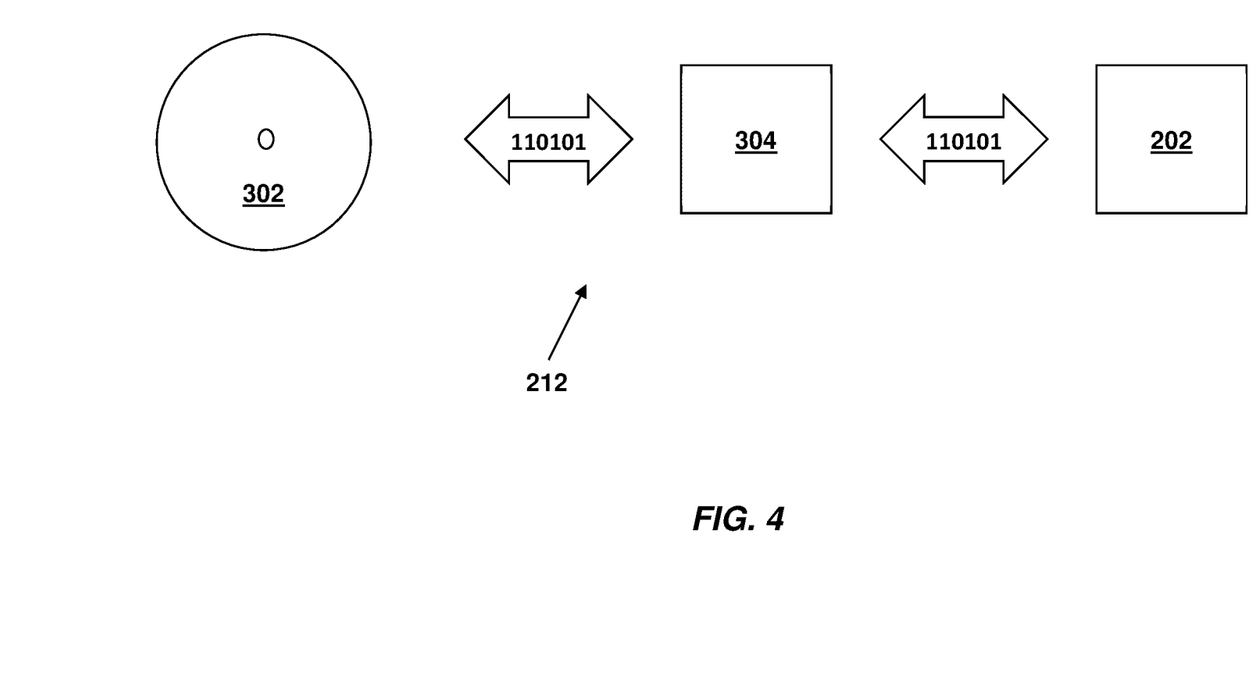
FIG. 4 is a block diagram of a memory system of the computer system of FIG. 3.

The storage system 212, shown in greater detail in FIG. 4, typically includes a computer readable and writeable nonvolatile recording medium 302 in which signals are stored that define a program to be executed by the processor or information to be processed by the program. The medium may include, for example, a disk or flash memory. Typically, in operation, the processor causes data to be read from the nonvolatile recording medium 302 into another memory 304 that allows for faster access to the information by the processor than does the medium 302. This memory 304 is typically a volatile, random access memory such as a dynamic random access memory (DRAM) or static memory (SRAM). It may be located in storage system 212, as shown, or in memory system 204. The processor 202 generally manipulates the data within the integrated circuit memory 204, 304 and then copies the data to the medium 302 after processing is completed. A variety of mechanisms are known for managing data movement between the medium 302 and the integrated circuit memory element 204, 304, and aspects and embodiments disclosed herein are not limited thereto. Aspects and embodiments disclosed herein are not limited to a particular memory system 204 or storage system 212.

The computer system may include specially-programmed, special-purpose hardware, for example, an application-specific integrated circuit (ASIC). Aspects and embodiments disclosed herein may be implemented in software, hardware or firmware, or any combination thereof. Further, such methods, acts, systems, system elements and components thereof may be implemented as part of the computer system described above or as an independent component.

Although computer system 200 is shown by way of example as one type of computer system upon which various aspects and embodiments disclosed herein may be practiced, it should be appreciated that aspects and embodiments disclosed herein are not limited to being implemented on the computer system as shown in FIG. 3. Various aspects and embodiments disclosed herein may be practiced on one or more computers having a different architecture or components that that shown in FIG. 3.

Computer system 200 may be a general-purpose computer system that is programmable using a high-level computer programming language. Computer system 200 may be also implemented using specially programmed, special purpose hardware. In computer system 200, processor 202 is typically a commercially available processor such as the well-known Pentium™ or Core™ class processors available from the Intel Corporation. Many other processors are available, including programmable logic controllers. Such a processor usually executes an operating system which may be, for example, the Windows 7, Windows 8, or Windows 10 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various aspects and embodiments disclosed herein. These components may be executable, intermediate (e.g., IL) or interpreted (e.g., Java) code which communicate over a communication network (e.g., the Internet) using a communication protocol (e.g., TCP/IP). In some embodiments one or more components of the computer system 200 may communicate with one or more other components over a wireless network, including, for example, a cellular telephone network.

It should be appreciated that the aspects and embodiments disclosed herein are not limited to executing on any particular system or group of systems. Also, it should be appreciated that the aspects and embodiments disclosed herein are not limited to any particular distributed architecture, network, or communication protocol. Various aspects and embodiments disclosed herein are may be programmed using an object-oriented programming language, such as SmallTalk, Java, C++, Ada, or C # (C-Sharp). Other object-oriented programming languages may also be used. Alternatively, functional, scripting, and/or logical programming languages may be used, for example ladder logic. Various aspects and embodiments disclosed herein are may be implemented in a non-programmed environment (e.g., documents created in HTML, XML or other format that, when viewed in a window of a browser program, render aspects of a graphical-user interface (GUI) or perform other functions). Various aspects and embodiments disclosed herein may be implemented as programmed or non-programmed elements, or any combination thereof.

The controller may be operated under a "fuzzy logic" regime. Fuzzy logic is a problem-solving control system methodology that lends itself to implementation in systems ranging from simple, small, embedded micro-controllers to large, networked, multi-channel PC or workstation-based data acquisition and control systems. It can be implemented in hardware, software, or a combination of both. Fuzzy logic provides a way to arrive at a definite conclusion based upon vague, ambiguous, imprecise, noisy, or missing input information. A fuzzy logic approach to control problems mimics how a person would make decisions, only much faster.

In a standard bivalent set theory, an object cannot belong to both a set and its complement. When describing temperature, for example, using sets such as "hot" and "cold" a certain temperature value either belongs to the "cold" set or the "hot" set, and never both at the same time. The boundaries of standard sets are exact. However, standard bivalent set theory is not descriptive of the real world. In the real world boundaries in sets are not exact and often blur together. Objects can belong to many sets to varying degrees. By using fuzzy logic one can build devices capable of reasoning with fuzzy sets and judge how they should operate or shift from one setting to another even when the criteria for making those changes are hard to define.

In a fuzzy logic algorithm, a crisp input value is first converted to fuzzy sets in a process called "fuzzification." The algorithm then uses rules to associate these fuzzy input sets to fuzzy output sets representing some control value, for example, motor speed or fluid flow rate.

Fuzzy logic incorporates a rule-based IF X AND Y THEN Z approach to solving a control problem rather than attempting to model a system mathematically. The fuzzy logic model is empirically-based, relying on an operator's experience rather than their technical understanding of the system. For example, rather than dealing with pH control in terms such as "Set_Point=2.0", "pH<1.6", or "pH 1.6<pH<2.2", terms like "IF (process is too acidic) AND (process is getting more acidic) THEN (increase water flow rate to the process)," "IF (process is too basic) AND (process is getting more basic rapidly) THEN (reduce the water flow rate to the process quickly)," "IF (process is too acidic) AND (process is getting more acidic) THEN (increase addition of alkaline material to the process)," or "IF (process is too basic) AND (process is getting more basic rapidly) THEN (reduce the addition of alkaline material to the process quickly)" are used. These terms are imprecise and yet very descriptive of what desirably should happen.

Fuzzy logic controllers are typically provided with some numerical parameters to facilitate operation, for example, what is considered significant error and significant rate-of-change-of-error. Exact values of these numerical parameters are usually not critical unless very responsive performance is required in which case empirical tuning would determine them. For example, a pH control system could use a single pH feedback sensor whose data is subtracted from the command signal to compute "error" (a degree of deviation of measured pH from a desired center point of a range of pH values) and then time-differentiated to yield the error slope or rate-of-change-of-error, hereafter called "error-dot." Error might have units of pH and a small error may be considered to be about 0.1 pH units while a large error might be about 0.5 pH units. The "error-dot" might then have units of pH units/min with a small error-dot being about 0.2 pH units/min and a large one being about 1.0 pH units/min. These values do not have to be symmetrical and can be altered once the system is operating to improve or optimize performance. Generally, fuzzy logic is inherently robust since it does not require precise, noise-free inputs and can be programmed to fail safely if a feedback sensor quits or is destroyed. The output control is a smooth control function despite a wide range of input variations. Since the fuzzy logic controller processes user-defined rules governing the target control system, it can be modified to improve or alter system performance New sensors can easily be incorporated into the system simply by generating appropriate governing rules.

Figure 5:
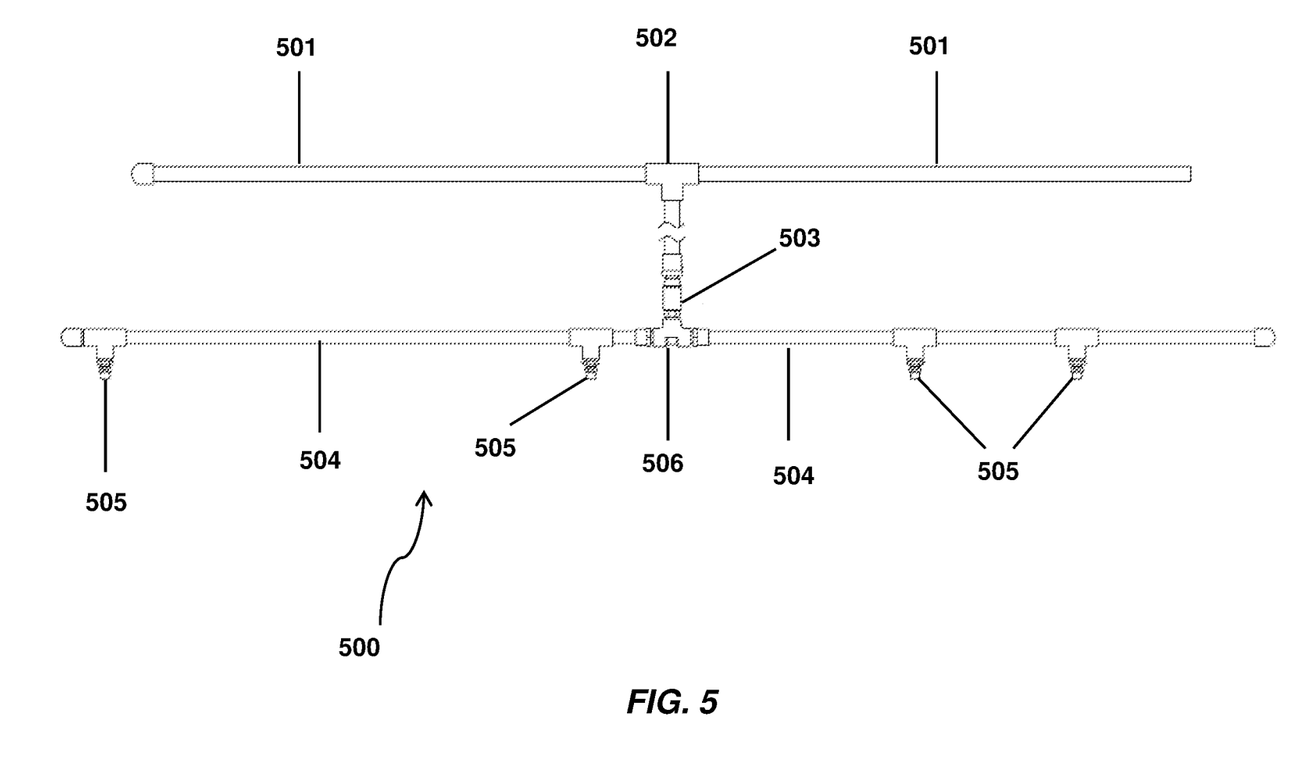
FIG. 5 is a front view of a rotating spray device in accordance with one embodiment of the invention.

A rotating spray device in accordance with some aspects of the invention is shown in FIG. 5. Rotating spray device 500 may comprise one or more support beams 501 for supporting the rotating spray device 500 within a biofilter. Upper swivel tee 502 may mate at least two support beams 501, for example, 180° apart. Swivel spray head assembly 503 may be vertically connected to upper swivel tee 502. Swivel spray head assembly 503 may be capable of moving. For example, swivel spray head assembly 503 may be capable of rotating, swiveling, shaking, or rocking. Swivel spray head assembly 503 may further be vertically connected to central hub 506. Central hub 506 may mate at least two arms 504, for example, 180° apart. Arms 504 may comprise one or more nozzles 505. For example, each arm may comprise two nozzles 505. Any number of nozzles may be connected to any number of arms. Nozzles 505 may be spaced apart to ensure even distribution of irrigation over the biofilter. In some embodiments, no two nozzles are positioned the same distance apart. In some embodiments, nozzles 505 may be of different sizes. For example, in some embodiments, nozzles 505 may be sized to allow for different irrigation flow rates. In some embodiments, nozzles 505 closer, or proximate, to the central hub 506 may be sized to allow for lower irrigation flow rates than the nozzles 505 farther away, or distal, from the central hub 506. Nozzles 505 may be adjustable to any spray angle required to keep the media bed moist.

Figure 6:
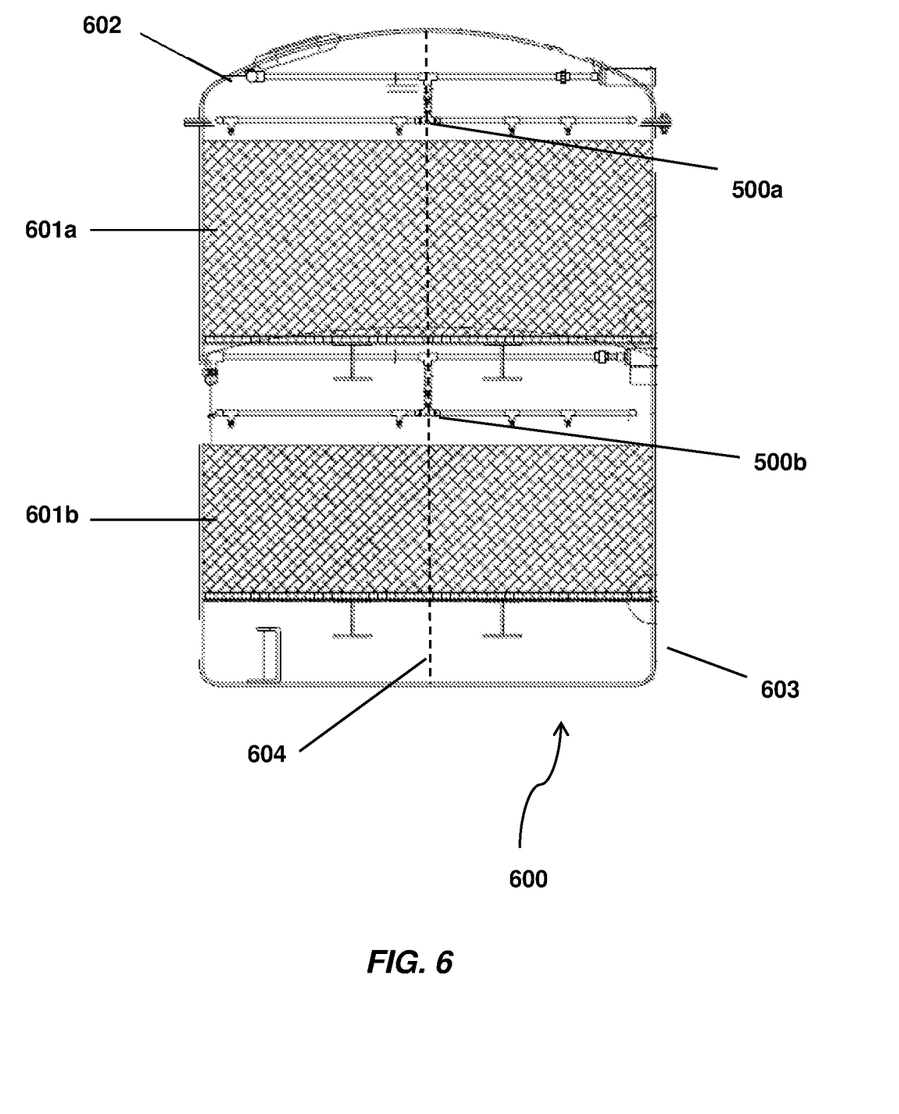
FIG. 6 is a schematic diagram of a biofilter equipped with rotating spray devices in accordance with one embodiment of the invention.

Rotating spray device 500 may be positioned within a biofilter, as shown in FIG. 6. In some embodiments rotating spray device 500a may be positioned above a media bed 601a of a biofilter vessel 602 in biofilter assembly 600. The central hub of each rotating spray device 500 may be positioned concentrically about central axis 604 of the biofilter vessel 602. In some embodiments, biofilter vessel 602 may comprise a lower media bed 601b positioned below media bed 601a. Rotating spray device 500b may be positioned below media bed 601a and above media bed 601b. In some embodiments, the biofilter may comprise only one media bed 601, and only one rotating spray device 500a positioned above it. In some embodiments, the biofilter may comprise a plurality of media beds 601. One rotating spray device 500 may be positioned over each media bed 601.

EXAMPLE

To determine the improved operation of a rotating spray device in a biofilter, the biofilter was operated with a typical single pigtail style spray device and subsequently with a rotating spray device. All other operating conditions remained the same.

Static Pigtail Style Spray Head

A Whisper 72 biofilter available from Evoqua Water Technologies (Warrendale, Pa.) was installed at Southwest Florida Lift Station. The biofilter having a diameter of 72 inches was filled with 134 ft$^3$ of foamed glass distributed in two beds. A single pigtail style spray head was installed for the bottom media layer of the biofilter, and its performance was measured continually over seven months.

The biofilter operated at about 200 cfm, or about one-third of the design air flow of 600 cfm. After two weeks, the flow was increased to 400 cfm. Data for the first month of operation indicated poor hydrogen sulfide removal, ranging from about 70% to about 95% removal. It was observed that the single pigtail style nozzle for the bottom media bed worked in a pattern such that an estimated 80% of the water sprayed the inner one-half of the diameter of the vessel, and even in circles concentric from the nozzle, the water spray was uneven and channeling occurred. Adjustments to optimize flow, drain water pH, and nutrient concentration were made, yet the target hydrogen sulfide removal rate of 99% was only met or exceeded on 3 of the 210 days of operation.

Rotating Spray Head System

The rotating spray device comprising a central hub, two arms extending distally from the central hub toward a wall of the biofilter, and two nozzles connected to each of the two arms was installed in the biofilter. The central hub was positioned at the center axis of the biofilter at 36 in from the walls. The fan nozzles were spaced on one arm centered at 4.5 inches and 31.5 inches from the central hub, and on the opposing arm at 13.5 inches and 22.5 inches from the central hub. The spray nozzles were spaced above the media bed so as to each give a spray pattern 9 inches wide on the surface of the media bed, so that the four nozzles covered the entire 36 inch radius of the media bed. The ratio of the area of the inner circle to each of the concentric rings was 1:3:5:7 and nozzles were chosen with a flow rate of 0.3, 0.8, 1.5, and 2.0 gallons per minute at 40 psi. It was observed that the media bed surface received approximately the same amount of water and nutrient per unit surface area of the media. The nutrient was a commercial 8-2-8 fertilizer with minors.

The top nozzle was timed to operate less than 1% of the total operating time. Within three days, the bed had acclimated such that the average daily hydrogen sulfide removal was 99.7%. In the next 60 days, the hydrogen sulfide removal rate was equal to or greater than 99% on 58 days. It was observed that the two days of less than 99% hydrogen sulfide removal experienced sudden increases in load on the system. For example, the first day that the goal was missed experienced an air flow increase from 438 cfm to 625 cfm. The hydrogen sulfide removal rate was still 97%. Within 24 hours, the media acclimated to the increased flow. It is believed that a slow increase in air flow would have allowed gradual acclimation. On the second day that the goal was missed, the concentration of hydrogen sulfide in the air stream increased from a morning average of 37 ppmv to an average of 199 ppmv for the rest of the day. The hydrogen sulfide removal rate was 95%. The unusually high concentration of hydrogen sulfide from the wet well continued for two more days, yet the biofilter acclimated and returned to 99% removal by the second day. It is believed that if the system was continually monitored, fresh air could have been introduced into the foul air stream to dilute the hydrogen sulfide.

The rotating spray device was in place on the biofilter for 291 days, and did not require maintenance during this time. This indicates that the rotating spray device is reliable. Data were collected for all but 28 days, due to monitor equipment failure. The average percent removal of hydrogen sulfide from the biofilter was 99%. When the proper operating parameters for the biofilter were maintained, the biofilter met and surpassed the hydrogen sulfide removal specification of 99% with an average load of 100 ppmv. This far surpassed the operation of the traditional pigtail style nozzles at the same conditions, with which the target hydrogen sulfide removal rate of 99% was only met or exceeded on 3 of the 210 days of operation.

Aspects and embodiments disclosed herein are not limited by the type of biofilter, the media used within the biofilter, the type and location of pH monitoring device, the type and location of the control valve and the type of controller used. It is not limited to the removal of $H_2S$ and can be used to remove any compound capable of being removed by a biofilter. More than one biofilter can be used in a staged configuration. If a staged configuration is used, the parameter of interest, for example, pH, is monitored and controlled from each stage. Multiple controllers can be used in a staged configuration. An acid and/or a base may be introduced into the water to control the pH.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

The invention claimed is:

1. A biofilter irrigation system, comprising:
 a cylindrical vessel having a central axis, a contaminated gas inlet, and a treated gas outlet, the contaminated gas inlet fluidly connected to a source of contaminated gas containing odorous compounds including hydrogen sulfide;
 a first media bed positioned within the cylindrical vessel;
 a swivel spray head assembly positioned above the first media bed fluidly connectable to a source of water, comprising:
  a central hub positioned at the central axis of the cylindrical vessel;
  at least one arm extending distally from the central hub toward a wall of the cylindrical vessel and configured to rotate about the central axis; and
  a plurality of nozzles connected to the at least one arm, the plurality of nozzles being spaced along the at least one arm at varying lengths from the central hub with each of the plurality of nozzles having a flow rate which increases with increasing distance from the central hub to provide an even distribution of irrigation from a middle of the first media bed to an outer area of the first media bed;
 a fluid sump positioned below the first media bed and configured to collect effluent and recirculate at least a portion of the effluent to the first media bed; and
 a control system comprising a pH sensor associated with the effluent or recirculation water and a controller in communication with the pH sensor and a valve of the source of water, the controller configured to maintain a pH level associated with the first media bed within a target pH range to promote growth or maintenance of a population of hydrogen sulfide oxidizing bacteria on the first media bed, wherein the controller is programmed to increase the flow of make-up water to the biofilter for irrigation of the first media bed by sending a first control signal to the valve if a detected pH level is below the target pH range and to decrease the flow of make-up water to the biofilter for irrigation of the first media bed by sending a second control signal to the valve if the detected pH level is above the target pH range.

2. The biofilter irrigation system of claim 1, wherein the contaminated gas inlet is positioned below the first media bed.

3. The biofilter irrigation system of claim 2, configured to remove at least about 90% of contaminants introduced to the biofilter.

4. The biofilter irrigation system of claim 1, wherein the first media bed comprises foamed glass media.

5. The biofilter irrigation system of claim 1, wherein a source of bio-nutrients is fluidly connectable to the swivel spray head assembly.

6. The biofilter irrigation system of claim 1, wherein a source of water is fluidly connectable to the swivel spray head assembly.

7. The biofilter irrigation system of claim 6, wherein two arms extend distally in opposite directions from the central hub toward a wall of the cylindrical vessel.

8. The biofilter irrigation system of claim 6, wherein four arms extend distally from the central hub toward a wall of the cylindrical vessel and are spaced 90° apart.

9. The biofilter irrigation system of claim 1, wherein a spray angle of the plurality of nozzles is each adjustable.

10. The biofilter irrigation system of claim 9, wherein the flow rates of the plurality of nozzles are adjustable.

11. The biofilter irrigation system of claim 10, wherein the flow rate of each nozzle in the plurality of nozzles is different.

12. The biofilter irrigation system of claim 1, further comprising a hydrogen sulfide concentration sensor at the treated gas outlet.

13. The biofilter irrigation system of claim 1, wherein the pH sensor provides an input signal to the control system, which provides an output signal to a source of water.

14. The biofilter irrigation system of claim 1, wherein the control system is further connected to a timer.

15. The biofilter irrigation system of claim 1, wherein the control system further comprises a nutrient concentration sensor.

16. The biofilter irrigation system of claim 1, wherein the cylindrical vessel comprises a second media bed.

17. The biofilter irrigation system of claim 16, wherein the cylindrical vessel comprises a second swivel spray head assembly positioned above the second media bed.

18. The biofilter irrigation system of claim 1, wherein the target pH range is from about 0 to about 4.

19. The biofilter irrigation system of claim 1, wherein the target pH range is from about 1.8 to about 2.2.

20. The biofilter irrigation system of claim 3, wherein a concentration of hydrogen sulfide is reduced by at least about 95%.

21. The biofilter irrigation system of claim 1, wherein the control system further comprises pressure sensors configured to detect a pressure drop across the first media bed.

22. The biofilter irrigation system of claim 21, wherein the controller is further configured to adjust at least one operational parameter in response to the pressure drop exceeding a threshold value.

23. The biofilter irrigation system of claim 1, wherein the controller is further programmed to increase the flow rate of make-up water during high hydrogen sulfide loadings, and to decrease or stop the flow rate of make-up water during periods of low hydrogen sulfide loadings.

* * * * *